(12) United States Patent
Zeng et al.

(10) Patent No.: US 7,917,587 B2
(45) Date of Patent: Mar. 29, 2011

(54) METHOD AND SYSTEM FOR PRIORITIZING COMMUNICATIONS BASED ON INTERPERSONAL RELATIONSHIPS

(75) Inventors: Hua-Jun Zeng, Beijing (CN); Zheng Chen, Beijing (CN); Benyu Zhang, Beijing (CN); Wei-Ying Ma, Beijing (CN)

(73) Assignee: Microsoft Corporation, Woodinville, WA (US)

( * ) Notice: Subject to any disclaimer, the term of this patent is extended or adjusted under 35 U.S.C. 154(b) by 1166 days.

(21) Appl. No.: 10/903,709

(22) Filed: Jul. 30, 2004

(65) Prior Publication Data

US 2006/0026298 A1    Feb. 2, 2006

(51) Int. Cl.
*G06F 15/16* (2006.01)
(52) U.S. Cl. ...................................... 709/206; 709/207
(58) Field of Classification Search .................. 709/206, 709/207
See application file for complete search history.

(56) References Cited

U.S. PATENT DOCUMENTS

| | | | |
|---|---|---|---|
| 5,671,425 A | 9/1997 | Suematsu et al. | |
| 5,694,616 A | 12/1997 | Johnson et al. | |
| 6,161,130 A | 12/2000 | Horvitz et al. | |
| 6,247,043 B1 | 6/2001 | Bates et al. | |
| 6,285,999 B1 * | 9/2001 | Page | 707/5 |
| 6,816,885 B1 * | 11/2004 | Raghunandan | 709/206 |
| 6,832,244 B1 * | 12/2004 | Raghunandan | 709/206 |
| 7,016,827 B1 | 3/2006 | Ramaswamy et al. | |
| 7,567,895 B2 | 7/2009 | Chen et al. | |
| 2002/0023135 A1 * | 2/2002 | Shuster | 709/206 |
| 2002/0076112 A1 | 6/2002 | Devara | |
| 2003/0167324 A1 * | 9/2003 | Farnham et al. | 709/224 |
| 2003/0177190 A1 * | 9/2003 | Moody et al. | 709/206 |
| 2003/0182379 A1 * | 9/2003 | Henry | 709/206 |
| 2005/0204001 A1 * | 9/2005 | Stein et al. | 709/206 |
| 2006/0026298 A1 | 2/2006 | Zeng | |
| 2009/0106019 A1 | 4/2009 | Chen et al. | |

FOREIGN PATENT DOCUMENTS

| | | |
|---|---|---|
| EP | 1 326 189 | 7/2003 |
| WO | WO01/09753 | 2/2001 |
| WO | WO01/69432 | 9/2001 |
| WO | WO01/93193 | 12/2001 |
| WO | WO 2004/053747 | 6/2004 |

OTHER PUBLICATIONS

Girvan, M. et al., Community Structure in Social and Biological Networks, www.pnas.org, Jun. 11, 2002.*
Girven, M. et al., Community Structure in Social and Biological Networks, Jun. 11, 2002.*
Shimbo, Masashi et al., "Automatic Classification of Sentences in the MEDLINE Abstracts: A Case Study of the Power of Word Sequence Features," Graduate School of Information Science, Japan, Mar. 2003 (4 pages).

(Continued)

*Primary Examiner* — Dohm Chankong
*Assistant Examiner* — Joseph Greene
(74) *Attorney, Agent, or Firm* — Perkins Coie LLP (57) ABSTRACT

A method and system for calculating the importance of persons based on interpersonal relationships and prioritizing communications based on importance of participants in the communications is provided. A prioritization system identifies relationships between persons and identifies the importance of a person to other persons based on these relationships. After the prioritization system identifies the importance of persons, the prioritization system can prioritize communications based on the importance of the senders or recipients.

2 Claims, 7 Drawing Sheets

OTHER PUBLICATIONS

Balter, Olle et al., "Bifrost Inbox Organizer: Giving Users Control Over the Inbox," Oct. 2, 2002 (20 pages).

Boone, Gary, "Concept Features in Re:Agent, an Intelligent Email Agent," Autonomous Agents 98 Minneapolist, MN, Copyright 1998 (7 pages).

Whittaker, Steve et al., "Contact Management: Identifying Contacts to Support Long-Term Communication," CSCW '02 Nov. 16-20, 2002, New Orleans, Louisiana (10 pages).

Kiritchenko, Svetlana et al., "Email Classification with Co-Training," School of Information Technology and Engineering, University of Ottawa, Ottawa, Canada, Nov. 2001 10 pages).

Berghel, Hal, "Email: The good, the bad and the ugly," Digital Village, Jan. 14, 1997 (6 pages).

Schmitt, Beverly "Sentence Fun," Copyright 1997-2002 (11 pages).

Megginsoln, David, "The Purpose of a Sentence," Copyright 1994, 1995 and 1996 by the University of Ottawa (2 pages) http://www.uottawa.ca/academic/arts/writcent/hypergrammar/sntpurps.html.

Adelson, Beth and Redmond, Mike, "What Would It Take To Have A Personal Assistant Who Fit Into Your World?," Mar. 23, 1998.

McDonald, Daniel and Chen, Hsinchun, "Using Sentence-Selection Heuristics to Rank Text Segments in TXTRACTOR," JCDL '02, Jul. 13-17, 2002.

Corston-Oliver, Simon et al., "Task-Focused Summarization of Email," Online, Jul. 2004 http://acl.ldc.upenn.edu/ac12004/texummarization/pdf/Corston.pdf.

Cohen, William W., "Learning to Classify Email into 'Speech Acts,'" ONline, Jul. 2004 http://www.cs.cmu.edu/[tom/EMNLP2004_final.pdf.

Ko, Youngjoong et al., "Improving Text Categorization Using the Importance of Sentences," Elsevier, Information Processing Management 40, 2004.

Shen, Dou et al., "Web-page Classification Through Summarization," SIGIR '04 Jul. 25-29, 2004, Sheffield, South Yorkshire, UK, Copyright 2004 ACM.

Sebastiani, Fabrizio, "Machine Learning in Automated Text Categorization," ACM Computing Surveys, vol. 34, No. 1, Mar. 2002.

European Search Report, European Patent Application No. EP 05 10 7797, Microsoft Corporation, Nov. 17, 2006.

Lee et al., "An Empirical Evaluation of Knowledge Sources and Learning Algorithms for Word Sense Disambiguation," Proceedings of the Conference on EMNLP, Jul. 2002, pp. 41-48.

* cited by examiner

METHOD AND SYSTEM FOR PRIORITIZING COMMUNICATIONS BASED ON INTERPERSONAL RELATIONSHIPS

TECHNICAL FIELD

The described technology relates to prioritizing communications, such as electronic mail messages.

BACKGROUND

A person can receive many hundreds of electronic communications each day. The electronic communications can include electronic mail messages, voice mail messages, memoranda, documents, and so on. The communications are typically sent from a sender (e.g., a person, group of persons, or organization) to one or more recipients (e.g., a person, group of persons, or organization). Because of the large number of communications, especially electronic mail messages that a person can receive, it can be very time-consuming for a user to access and process all their communications. Indeed, because of the large number of electronic mail messages, it may be difficult for a user to identify an important electronic mail message that may need prompt attention out of all the electronic mail messages of lesser importance. To help locate messages, some electronic mail systems allow a person to specify the order in which electronic mail messages are displayed. For example, a person can specify to order electronic mail messages based on time of delivery, sender, subject, and so on.

These techniques for ordering electronic mail messages and other communications do not, however, provide much useful insight into the importance of communications. For example, if an employee wants to view electronic mail messages sent from their supervisor as soon as possible, the employee may need to order the inbox based on sender and then review the list of messages to see if any were sent by the supervisor. It would be desirable to provide a technique that would allow for communications to be automatically prioritized so a person can focus their attention on communications that are important before focusing their attention on communications of lesser importance.

SUMMARY

A method and system for calculating the importance of persons based on interpersonal relationships is provided. The interpersonal relationships may include participant relationships, distribution relationships, and organizational relationships as described below. The system may represent interpersonal relationships as links between persons and apply a link-based ranking algorithm to calculate the importance of the persons. When a person receives a communication, the system can prioritize the communication relative to other communications based on the importance of the participants of the communication such as the sender.

DETAILED DESCRIPTION

A method and system for calculating the importance of persons based on interpersonal relationships and prioritizing communications based on importance of participants in the communications is provided. In one embodiment, a prioritization system identifies relationships between persons and identifies the importance of a person to other persons based on these relationships. A relationship between two persons may be that one person is a recipient of a communication sent by another person who is a sender. Thus, the recipient has a "recipient" relationship to the sender. A person who has a recipient relationship with many senders on many communications may be considered an "important" person. Thus, it may be desirable to promptly review a communication from such an important person. Also, a person who receives communications from other important persons may themselves be important. Importance could also be based on a "sender" relationship in that a person who sends a lot of communications to other persons, especially important persons, may be important. The sender and recipient relationships are referred to as "participant" relationships. Another relationship between two persons may be that both of them are members of the same distribution list such as an electronic mail distribution list. Thus, the persons have a "distribution" relationship to each other. A person who has a distribution relationship with many other persons on many distribution lists, especially other important persons, may be considered to be an important person. Another relationship between two persons may be that they are members of the same organization that can be represented by an organizational chart. Thus, two persons in the same organization have an "organizational" relationship. The importance of one person to another person within an organization may be based on the distance between the persons within the organizational chart hierarchy. After the prioritization system identifies the importance of persons, the prioritization system can prioritize communications based on the importance of the senders or recipients. The prioritization system may set the priority of a communication based on the importance of the source (e.g., sender, originator, creator) of the communication. The source may be a person other than the sender. For example, an executive assistant may send an electronic mail message on behalf of an executive who created the message. If multiple persons are associated with the source (e.g., an electronic mail message sent from a group), the prioritization system may set the priority based on an aggregate importance of the members of the group. The prioritization system may also base the priority of a communication on the importance of the targets (e.g., recipient, recipient's supervisor) of the communication. For example, senders may send electronic mail messages intended for an executive to the executive's assistant. If a communication is sent to many important persons, then the communication is more likely to be of high interest to a recipient based on the aggregate importance of the recipients.

In the following, the prioritization system is described in the context of an electronic mail system. One skilled in the art will appreciate, however, that the prioritization system can be used in the context of other communication systems.

In one embodiment, the prioritization system calculates the importance of persons by applying a ranking algorithm to participant relationships and in particular to recipient relationships. The prioritization system may generate a matrix with rows and columns representing persons with each element at the intersection of a row and column representing the number of times that the person of the column is a recipient of an electronic mail message in which the person of the row is a sender. The prioritization system may generate the matrix based on analyzing electronic mail messages of all the persons within an organization. When privacy, confidentiality, or other concerns do not allow access to such electronic mail messages, the prioritization system can generate the matrix based on electronic mail messages sent or received by a single person. Also, the prioritization system may aggregate matrices that are each based on the electronic mail messages of a single person into an aggregate matrix for an organization or portion of an organization whose members agree to participate in the aggregation. The prioritization system can collect the matrices in a way that helps ensure the privacy of the individuals. After the matrix is generated, the prioritization system applies a ranking algorithm to the matrix to calculate the importance of each person. The ranking algorithm may be a linked-based ranking algorithm such as a PageRank-type algorithm or a HITS-type algorithm applied to the interpersonal relationships rather than to link relationships of web pages. The interpersonal relationships are represented as links between persons. The PageRank and HITS algorithms are described below.

In another embodiment, the prioritization system calculates the importance of persons by applying a ranking algorithm to the distribution relationships. The prioritization system may generate a matrix with rows and columns representing persons with each element at the intersection of a row and column representing the number of times that the person of the column is on the same distribution list as the person of the row. The prioritization system may generate the matrix based on analyzing electronic mail distribution lists of an organization. After the matrix is generated, the prioritization system applies a ranking algorithm to the matrix to calculate the importance of each person. The ranking algorithm may be a linked-based ranking algorithm such as a PageRank-type algorithm or a HITS-type algorithm applied to the interpersonal relationships rather than to link relationships of web pages.

In another embodiment, the prioritization system calculates the importance of one person to another person based on organizational relationships. The prioritization system may use an electronic representation of an organizational chart to identify the relationship between two persons. The organization relationship may be established when the persons are in the same organization, and a reporting relationship may be established when one person of the organization reports to another person of the organization directly or indirectly. For example, an employee and the employee's supervisor may have a reporting relationship. The importance of one person who has an organizational relationship to another person may be based on the difference in their levels within the hierarchy of the organization and based on how many persons are at the same level. For example, a supervisor of an employee may be important to the employee because the employee has only one supervisor. However, the employee may be less important (in terms of communications) to the supervisor because the supervisor may supervise many employees and each supervised employee may have the same importance to the supervisor. As another example, a supervisor of an employee may be more important to the employee than the supervisor's supervisor because the employee reports only indirectly to the supervisor's supervisor. The importance based on an organizational relationship may be represented by the following equation:

$$a_j(i) = \frac{1}{len(i, j) \cdot |\{k \mid len(k, j) = len(i, j)\}|} \quad (1)$$

where $a_j(i)$ represents the importance of person i to person j, $len(i,j)$ represents the distance or length from person i to person j, and $|\{k \mid len(k,j)=len(i,j)\}|$ is the number of persons the same distance and direction away from person j as person i. For example, the distance between a supervisor and an employee is 1, and the distance between the supervisor's supervisor and the employee is 2. Thus, the importance of the supervisor to the employee is 1, but the importance of the employee to the supervisor who supervises 5 employees is 1/5. Further, the importance of the supervisor's supervisor to the employee is 1/2, and the importance of the employee to the supervisor's supervisor is 1/20, when the supervisor's supervisor has 10 employees at the same level of the organization chart as the employee. One skilled in the art will appreciate that the importance based on an organizational relationship can be defined in many different ways. For example, the importance can decrease exponentially based on distance within the hierarchy between two persons. The distance may also be limited to a reporting distance between persons with a reporting relationship. For example, two employees who report to the same supervisor would not have a reporting relationship and thus the importance based on the reporting relationship would be 0. However, if a non-reporting relationship is used, then the distance between them would be 2 (i.e., 1 from an employee to a common supervisor and 1 from the common supervisor to the other employee), and their importance would be 1/10, when there are 5 employees at the same level.

In one embodiment, the importance of a person can be based on a combination of various methods for calculating importance. For example, the prioritization system could calculate the importance of a person by taking a weighted average of the importances based on participant relationships, distribution relationships, organizational relationships, and so on. The weight applied to each importance may reflect the confidence that it accurately reflects the real importance of a person. For example, if a participant relationship is considered twice as accurate as a distribution relationship or an organizational relationship, then the weights for the participant, distribution, and organizational relationships may be 0.5, 0.25, and 0.25. The importances may also be normalized to a value between 0 and 1 to facilitate their combining. The weights can be identified by a regression method based on training data. Regression tries to determines the relationship between two random variables $x=(x_1, x_2, \ldots x_p)$ and y. A linear regression method explains the relationship between x and y with a straight line fit to the training data. The linear regression method postulates that:

$$y = b_0 + \sum_{j=1}^{p} b_j x_j + e \quad (2)$$

where the "residual" e is a random variable with a mean of zero and the coefficients $b_j (0 \leq j \leq p)$ are determined by the condition that the sum of the square of the residuals is as small as possible. Therefore, the linear combination with $b_j$ should be better than those with any other coefficients. The variable x can come directly from inputs, or some transformations of inputs, such as a logarithmic or a polynomial transformation.

Figure 1:
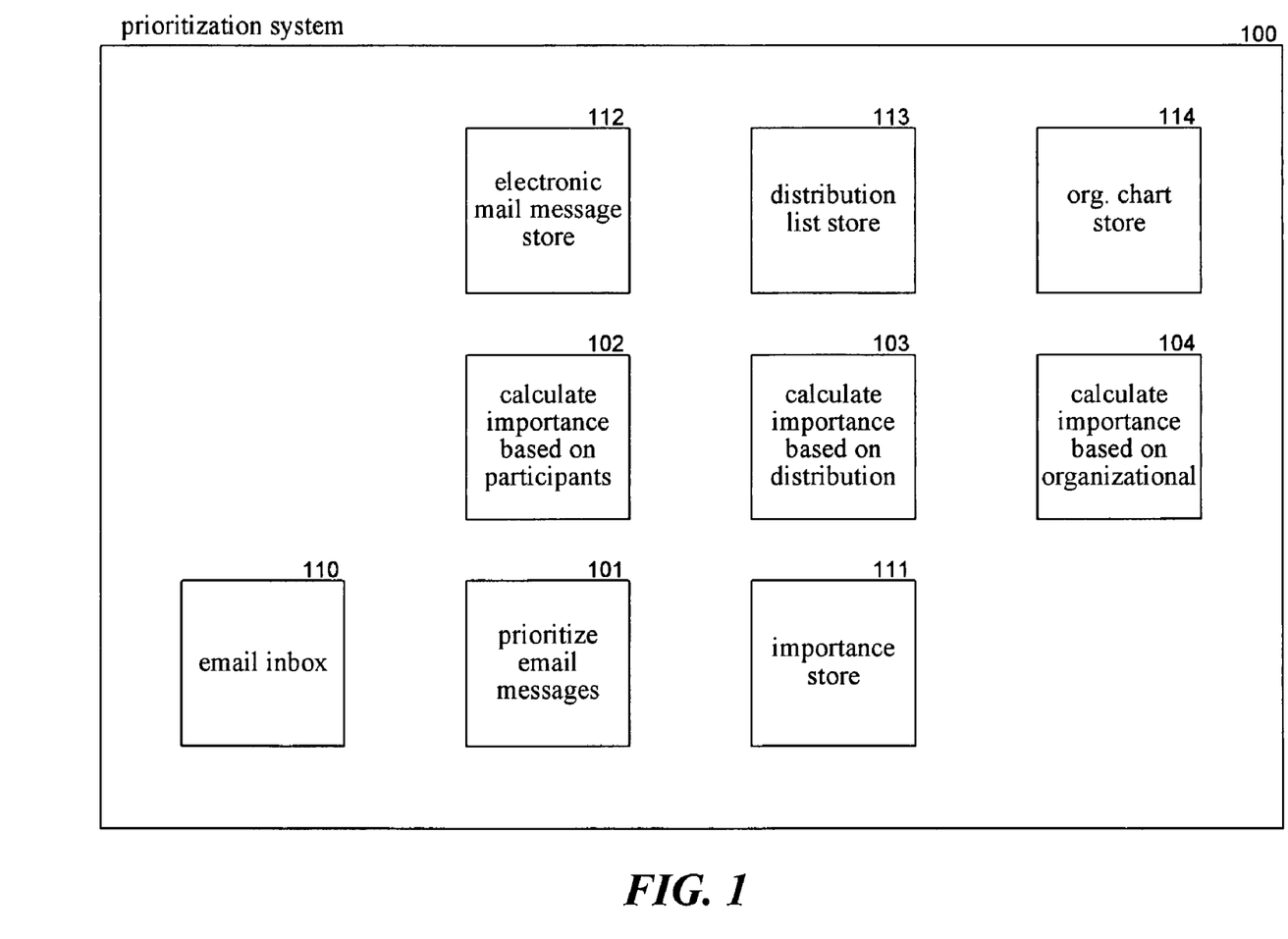
FIG. 1 is a block diagram that illustrates components of the prioritization system in one embodiment.

FIG. 1 is a block diagram that illustrates components of the prioritization system in one embodiment. The prioritization system 100 includes a prioritize electronic mail messages component 101, a calculate importance based on participant relationship component 102, a calculate importance based on distribution relationship component 103, and a calculate importance based on organizational relationship component 104. The prioritize electronic mail messages component may be invoked periodically to prioritize the messages in an electronic mail inbox 110. The component may prioritize the messages in the inbox based on the information of an importance store 111 and prioritize each message as it is received. The component may prioritize the messages based on the importance of the sender as indicated by the importance store. The importance information of the importance store may be calculated by one of the calculate importance components. Alternatively, the importance of the person may be based on a combination of the importances calculated by different calculate importance components. The calculate importance based on participant relationship component may generate a matrix of the sender-recipient relationships based on the information of an electronic mail message store 112. The electronic mail message store may contain all electronic mail messages sent or received by an organization or an individual. The calculate importance based on participant relationship component then applies a ranking algorithm to calculate an importance for each person. The calculate importance based on distribution relationship component may generate a matrix of the distribution relationships based on information in a distribution list store 113. The calculate importance based on distribution relationship component may generate a matrix based on persons being on the same distribution list. The calculate importance based on distribution relationship component then applies a ranking algorithm to calculate the importance of each person. The calculate importance based on organizational relationship component calculates the importance of persons based on the information of an organizational chart store 114.

The computing device on which the prioritization system is implemented may include a central processing unit, memory, input devices (e.g., keyboard and pointing devices), output devices (e.g., display devices), and storage devices (e.g., disk drives). The memory and storage devices are computer-readable media that may contain instructions that implement the prioritization system. In addition, the data structures and message structures may be stored or transmitted via a data transmission medium, such as a signal on a communications link. Various communications links may be used, such as the Internet, a local area network, a wide area network, or a point-to-point dial-up connection.

The prioritization system may be implemented in various operating environments that include personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The prioritization system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Two well-known techniques for ranking web pages are PageRank and HITS ("Hyperlink-Induced Topic Search"). The prioritization system may apply these algorithms to the participant and distribution relationship matrices to calculate the importance or rank of the persons based on the relationship. PageRank is based on the principle that web pages will have links (i.e., "outgoing links") to important web pages. Thus, the importance of a web page is based on the number and importance of other web pages that link to that web page (i.e., "incoming links"). Similarly, the importance of a person can be based on the number of and importance of other persons who send electronic mail messages to that person. Thus, the web pages of these ranking algorithms can be replaced by persons and the links by their interpersonal relationship. In a simple form, the links between web pages can be represented by matrix A, where $A_{ij}$ represents the number of outgoing links from web page i to web page j. The importance score $w_j$ for web page j can be represented by the following equation:

$$w_j = \Sigma_i A_{ij} w_i$$

This equation can be solved by iterative calculations based on the following equation:

$$A^T w = w$$

where w is the vector of importance scores for the web pages and is the principal eigenvector of $A^T$. To ensure the iteration will converge, "random walk" is added when calculating the page score $w_j$.

The HITS technique is additionally based on the principle that a web page that has many links to other important web pages may itself be important. Thus, HITS divides "importance" of web pages into two related attributes: "hub" and "authority." "Hub" is measured by the "authority" score of the web pages that a web page links to, and "authority" is measured by the "hub" score of the web pages that link to the web page. In contrast to PageRank, which calculates the importance of web pages independently from the query, HITS calculates importance based on the web pages of the result and web pages that are related to the web pages of the result by following incoming and outgoing links. HITS submits a query to a search engine service and uses the web pages of the results as the initial set of web pages. HITS adds to the set those web pages that are the destinations of incoming links and those web pages that are the sources of outgoing links of the web pages of the result. HITS then calculates the authority and hub score of each web page using an iterative algorithm. The authority and hub scores can be represented by the following equations:

$$a(p) = \sum_{q \to p} h(q) \quad \text{and} \quad h(p) = \sum_{p \to q} a(q)$$

where a(p) represents the authority score for web page p and h(p) represents the hub score for web page p. HITS uses an adjacency matrix A to represent the links. The adjacency matrix is represented by the following equation:

$$b_{ij} = \begin{cases} 1 & \text{if page } i \text{ has a link to page } j, \\ 0 & \text{otherwise} \end{cases}$$

The vectors a and h correspond to the authority and hub scores, respectively, of all web pages in the set and can be represented by the following equations:

$$a = A^T h \text{ and } h = Aa$$

Thus, a and h are eigenvectors of matrices $A^T A$ and $AA^T$.

Figure 2:
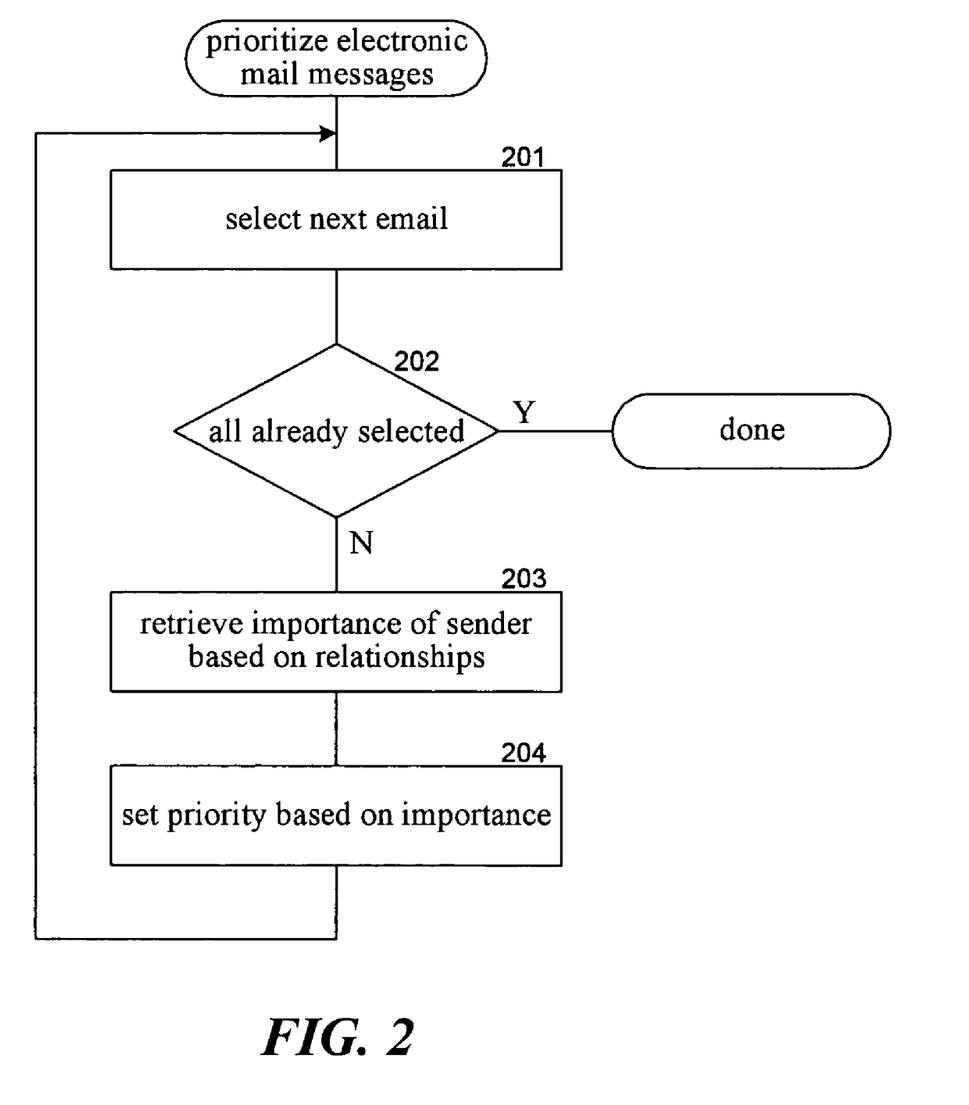
FIG. 2 is a flow diagram that illustrates the prioritize electronic mail messages component in one embodiment.

FIG. 2 is a flow diagram that illustrates the prioritize electronic mail messages component in one embodiment. The component loops selecting each message of an inbox and assigning a priority based on the importance of the sender as indicated by the importance store. In block 201, the component selects the next electronic mail message. In decision block 202, if all the electronic mail messages have already been selected, then the component completes, else the component continues at block 203. In block 203, the component retrieves the importance of the sender from the importance store. In block 204, the component sets the priority of the selected electronic mail message based on the importance of the sender. The component may also base the priority of the message based on the importance of other recipients of the electronic mail message and based on whether those recipients are to-recipients or cc-recipients. The component then loops to block 201 to select the next electronic mail message.

Figure 3:
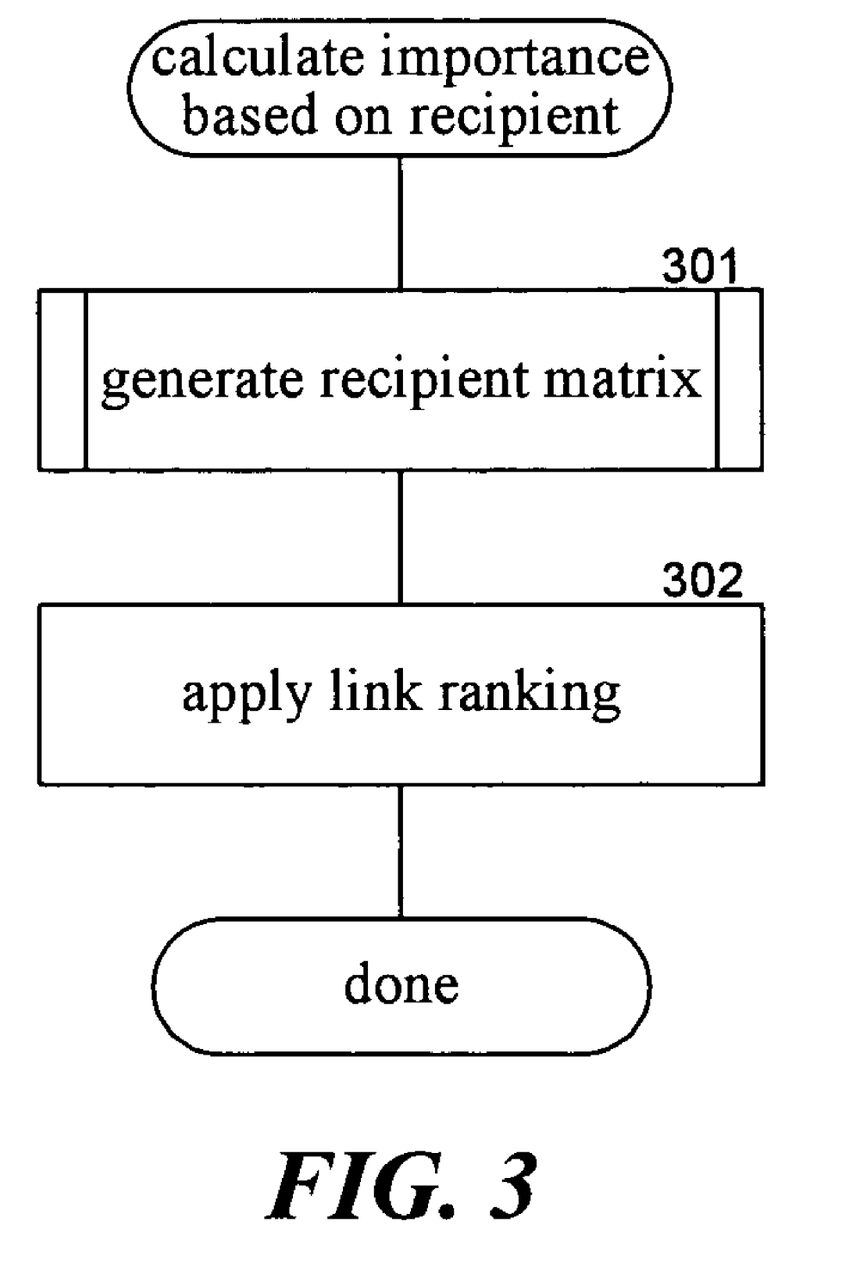
FIG. 3 is a flow diagram that illustrates the processing of a calculate importance based on recipient relationship component in one embodiment.

FIG. 3 is a flow diagram that illustrates the processing of a calculate importance based on recipient relationship component in one embodiment. This component calculates importance based on a participant being a recipient. In block 301, the component invokes a generate recipient matrix component to generate a matrix that indicates the recipient relationships between senders and recipients of electronic mail messages in the electronic mail message store. In block 302, the component applies a ranking algorithm to the matrix to calculate the importance of each person. The component then completes.

Figure 4:
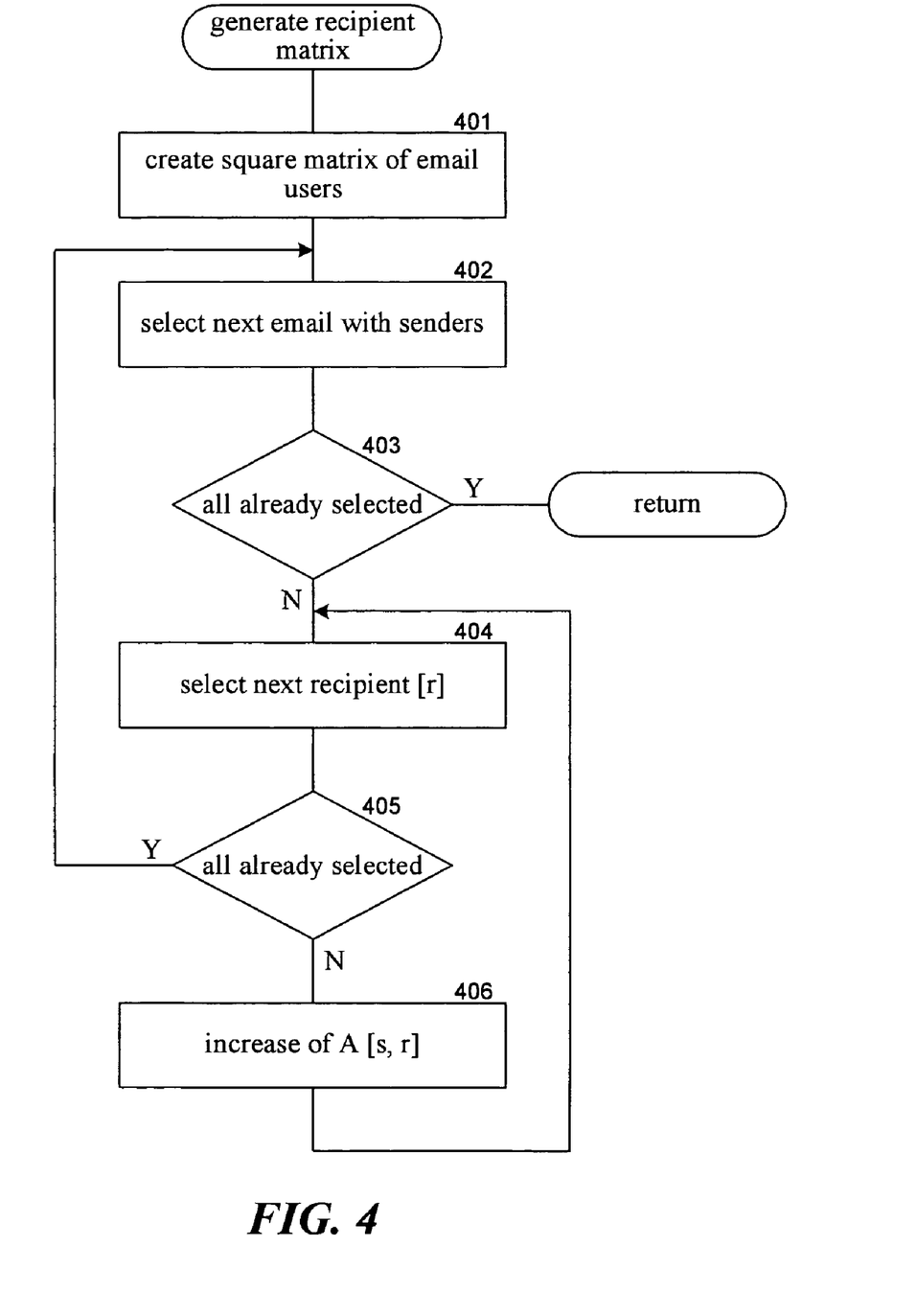
FIG. 4 is a flow diagram that illustrates the processing of the generate recipient matrix component in one embodiment.

FIG. 4 is a flow diagram that illustrates the processing of the generate recipient matrix component in one embodiment. The component generates a square matrix of persons that are senders and recipients of the electronic mail messages of the electronic mail message store. In block 401, the component generates a square matrix of the electronic mail message participants (i.e., senders and recipients). In blocks 402-406, the component loops selecting each electronic mail message and updating the matrix accordingly. In block 402, the component selects the next electronic mail message. In decision block 403, if all the electronic mail messages have already been selected, then the component returns, else the component continues at block 404. In block 404, the component selects the next recipient of the selected electronic mail message. In decision block 405, if all the recipients have already been selected, then the component loops to block 402 to select the next recipient, else the component continues at block 406. In block 406, the component increments the value of the matrix indexed by the sender and the selected recipient of the selected electronic mail message. The component then loops to block 404 to select the next recipient. In one embodiment, if there are multiple senders, the component updates the element for each sender and recipient combination of the matrix. The component may also increase the value less when the recipient is a cc-recipient rather than a to-recipient.

Figure 5:
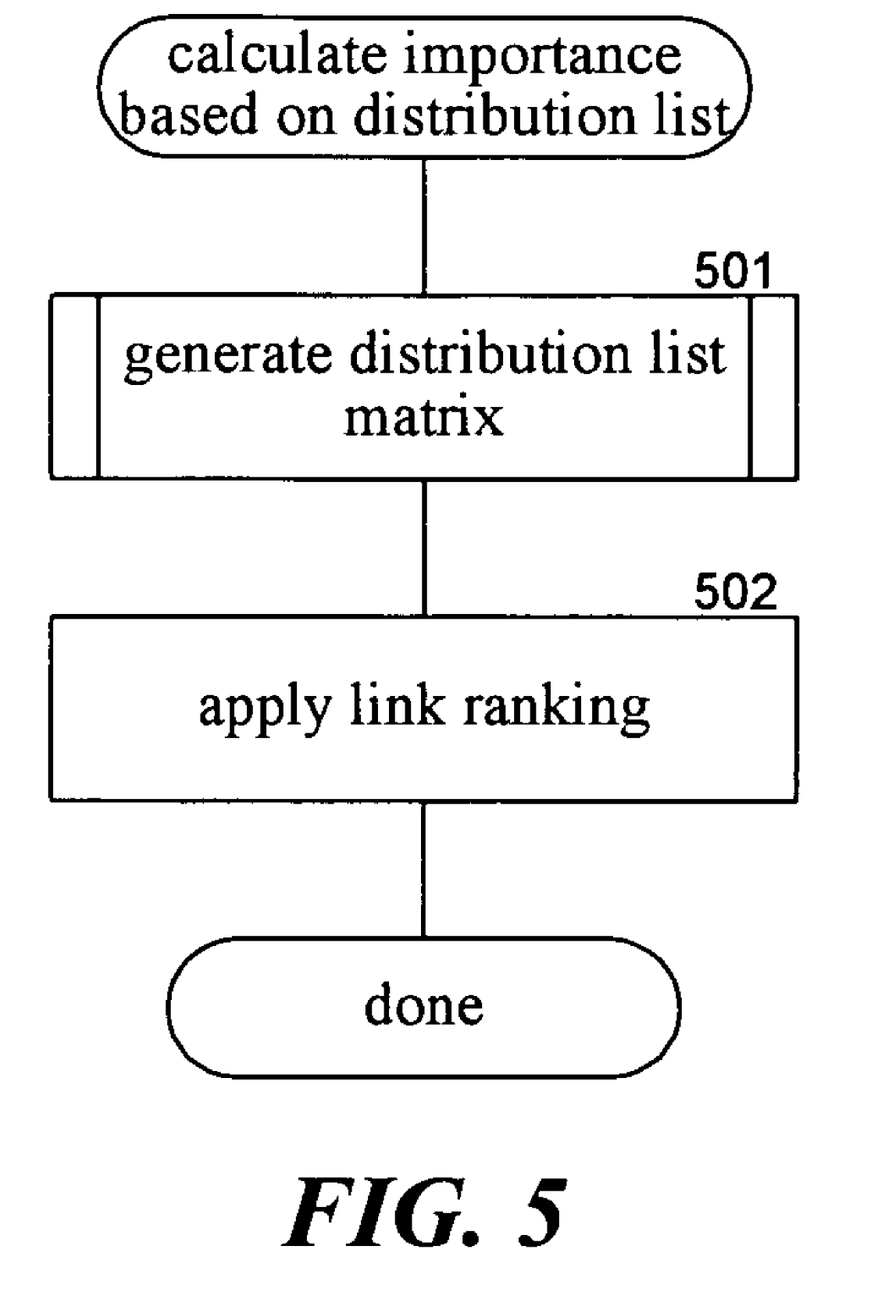
FIG. 5 is a flow diagram that illustrates the processing of the calculate importance based on distribution relationship component in one embodiment.

FIG. 5 is a flow diagram that illustrates the processing of the calculate importance based on distribution relationship component in one embodiment. In block 501, the component invokes a generate distribution matrix component to generate a matrix that indicates the distribution relationships between persons on the same distribution list. In block 502, the component applies a ranking algorithm to the matrix to calculate the importance of each person based on their distribution relationships. The component then completes.

Figure 6:
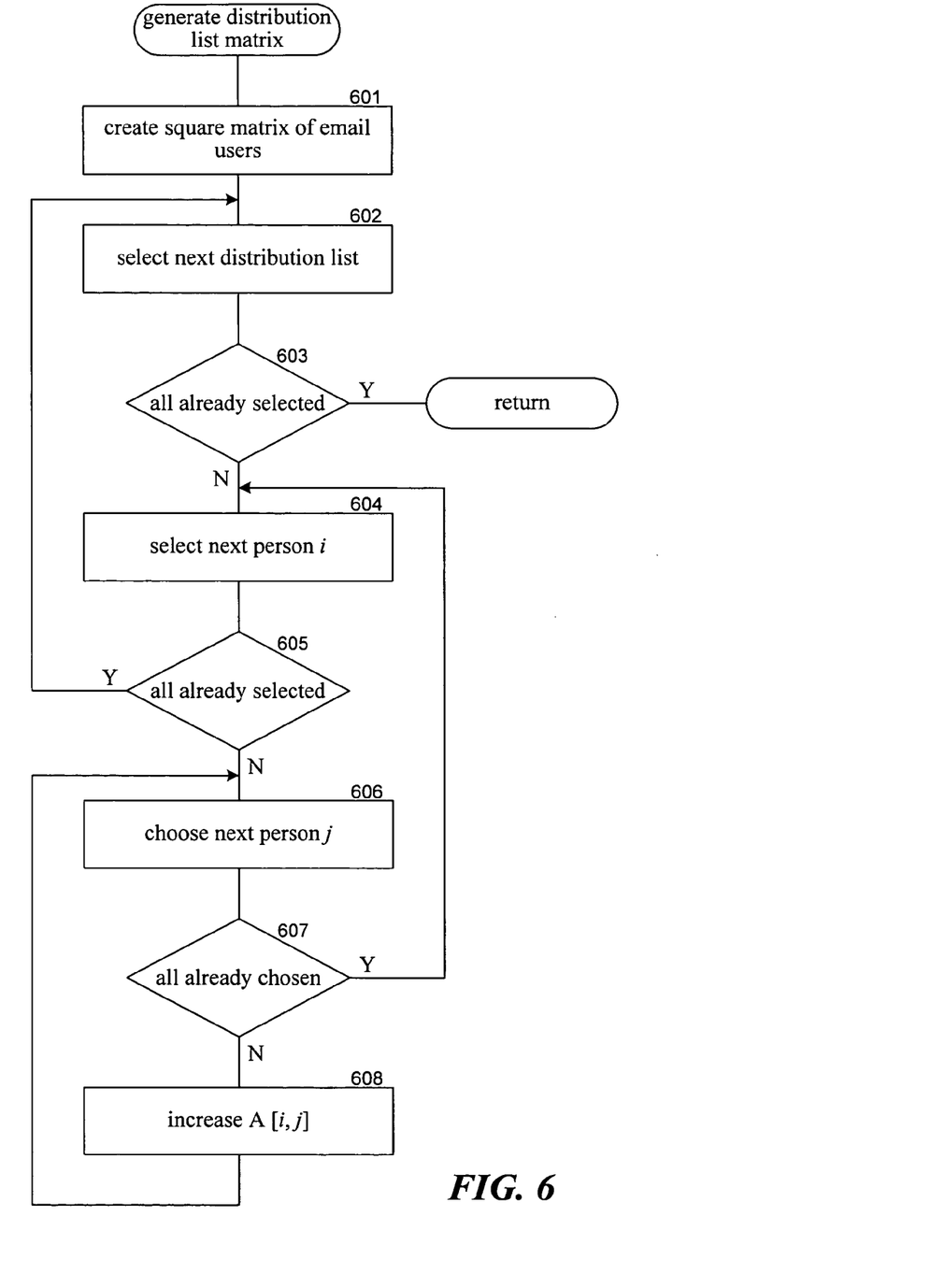
FIG. 6 is a flow diagram that illustrates the processing of the generate distribution matrix component in one embodiment.

FIG. 6 is a flow diagram that illustrates the processing of the generate distribution matrix component in one embodiment. The component generates a square matrix of persons that are on a distribution list within the distribution list store. In block 601, the component creates a square matrix of the persons on the distribution lists. In blocks 602-608, the component loops selecting each distribution list and updating the matrix accordingly. In block 602, the component selects the next distribution list of the distribution list store. In decision block 603, if all the distribution lists have already been selected, then the component returns, else the component continues at block 604. In blocks 604-608, the component loops selecting each person on the selected distribution list and updating the matrix element for each other person on the selected distribution list. In block 604, the component selects the next person on the selected distribution list. In decision block 605, if all the persons have already been selected, then the component loops to block 602 to select the next distribution list, else the component continues at block 606. In block 606, the component chooses the next person on the distribution list other then the selected person. In decision block 607, if all the persons other than the selected person have already been chosen, then the component loops to block 604 to select the next person, else the component continues at block 608. In block 608, the component increments the value of the element of the matrix indexed by the selected person and the chosen person to indicate the distribution relationship. The component then loops to block 606 to choose the next person of the selected distribution list. The component may increase the value of the element of the matrix according to the number of persons on the distribution list. For example, if the distribution list contains only two persons, then each person may be more important to the other than if the distribution list contains a thousand persons.

Figure 7:
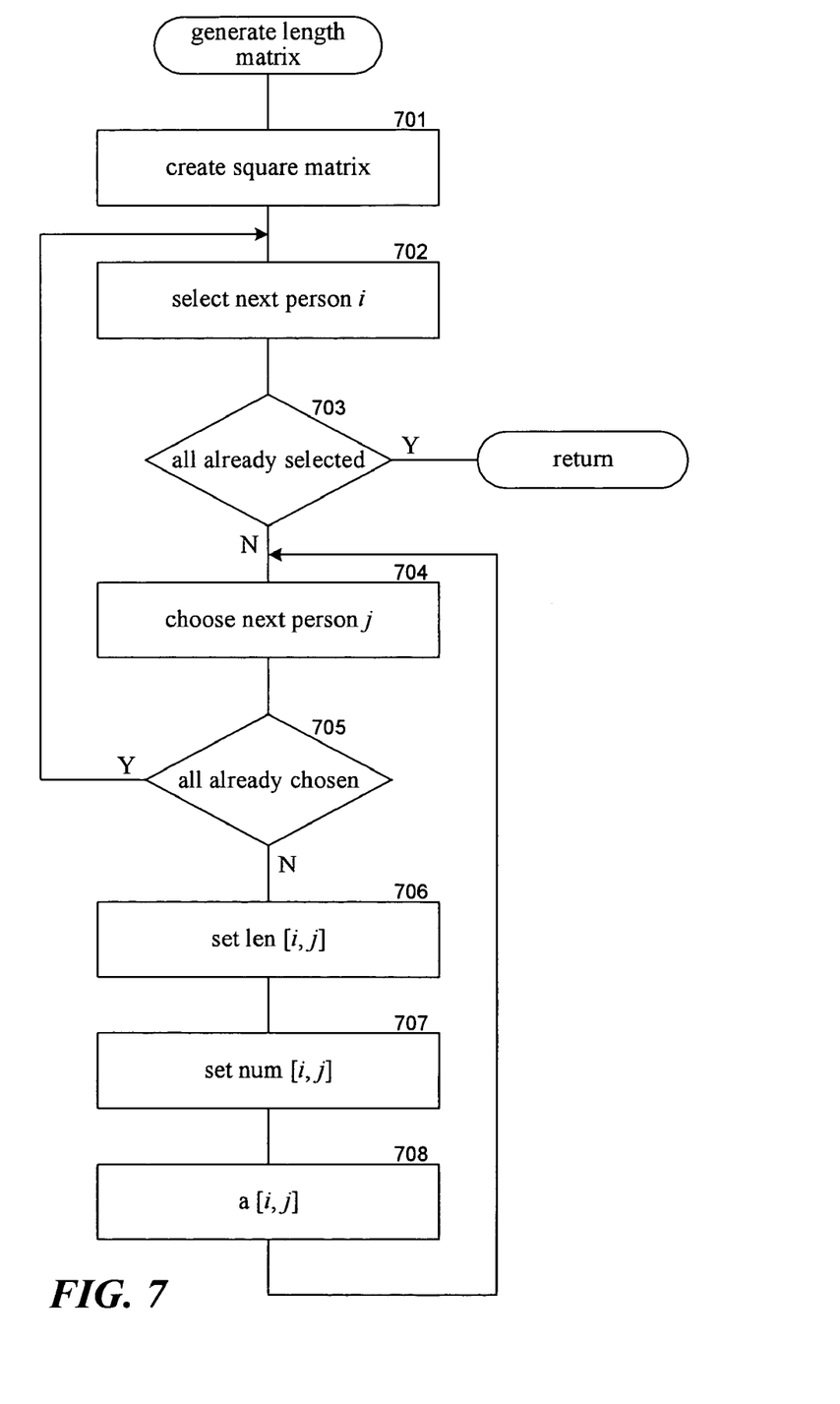
FIG. 7 is a flow diagram that illustrates the processing of the calculate importance based on organizational relationship component in one embodiment.

FIG. 7 is a flow diagram that illustrates the processing of the calculate importance based on organizational relationship component in one embodiment. The component loops selecting each pair of persons of the organization, calculating their distance and number of persons at a similar level, and calculating the importance based on the distance and number. In block 701, the component creates a square matrix of the persons. In block 702, the component selects the next person in the organization. In decision block 703, if all the persons in the organization have already been selected, then the component returns, else the component continues at block 704. In block 704, the component chooses the next person of the organization for the selected person. In decision block 705, if all the persons have already been chosen, then the component loops to block 702 to select the next person, else the component continues at block 706. In block 706, the component calculates the distance or length between the selected person and the chosen person. The distance may be defined as the sum of the levels between the selected person and the chosen person and their closest common ancestor (referring to parent and child relationships of a tree representing the organizational hierarchy). For example, if the selected person is 2 levels down and the chosen person is 1 level down from their closest common ancestor, then their distance would be 3. If the selected person is an ancestor of the chosen person, then the selected person would be considered the closest common ancestor. For example, if the chosen person is 2 levels down from the selected person, then the selected person would be 0 levels down and the chosen person would be 2 levels down, giving a distance of 2. In block 707, the component calculates the number of persons considered at the same level for purposes of Equation 1 for the selected and chosen persons. The number may be defined as the sum of the number of persons at the same level down from their closest common ancestor. For example, if the selected person is 2 levels down and the chosen person is 1 level down from their closest common ancestor and the selected person has 25 persons at the same level and the chosen person has 7 persons at the same level, then the number would be 32. If the selected person is an ancestor of the chosen person, then the number may be set to 1. In block 708, the component calculates the importance based on Equation 1 and then loops to block 704 to choose the next person.

One skilled in the art will appreciate that although specific embodiments of the prioritization system have been described herein for purposes of illustration, various modifications may be made without deviating from the spirit and scope of the invention. Accordingly, the invention is not limited except by the appended claims.

We claim:

1. A method in a computer system for determining priority of a communication having persons who are participants in the communication, the method comprising:
    identifying sender and recipient relationships between persons, the persons including senders and recipients of communications, the relationships being sender and recipient relationships such that a sender and recipient relationship between a first person and a second person occurs when the first person is a sender of a communication and the second person is a recipient of that communication by:
        generating a sender and recipient matrix of entries with a row and a column for each participant in a communication that is an electronic mail message; and
        for each electronic mail message,
            for each recipient of that electronic mail message,
                incrementing the entry of the sender and recipient matrix corresponding to the sender of the electronic mail message and that recipient;
    identifying distribution list relationships between persons, the persons being on distribution lists for communications, the relationships being distribution lists relationships such that a relationship between a first person and a second person occurs when the first person and the second person are on the same distribution list by:
        generating a distribution list matrix of entries with a row and a column for each person on a distribution list; and
        for each distribution list,
            for each person on that distribution list,
                incrementing the entries of the distribution list matrix corresponding to that person and each other person on the distribution list;
    calculating a sender and recipient importance of each person based on the sender and recipient relationships
        wherein the sender and recipient importance of the persons is calculated by iteratively calculating the sender and recipient importance of each person based on the sender and recipient importance of each person as calculated in a previous iteration until the sender and recipient importance of the persons converges on a solution; and
        wherein the calculating of the sender and recipient importance of the persons is based on the following equation:

$$A^T w = w$$

where $A^T$ represents a transpose of the sender and recipient matrix such that $A_{ij}$ represents the number of electronic mail messages sent from person i and person j and w is a vector of with a sender and recipient importance score $w_j$ for each person j as represented by the following equation:

$$w_j = \Sigma_i A_{ij} w_i; \text{ and}$$

calculating a distribution list importance of each person based on the identified distribution list relationships
        wherein distribution list importance of the persons is calculated by iteratively calculating the distribution list importance of each person based on the distribution list importance of each person as calculated in a previous iteration until the distribution list importance of the persons converges on a solution; and
        wherein the calculating of the distribution list importance of the persons is based on the following equation:

$$A^T w = w$$

where $A^T$ represents a transpose of the distribution list matrix such that $A_{ij}$ represents the number of distribution lists that both person i and person j are on and w is a vector of with a distribution importance score $w_j$ for each person j as represented by the following equation:

$$w_j = \Sigma_i A_{ij} w_i;$$

calculating an importance for each person based on the sender and recipient importance and the distribution list importance of that person; and
    calculating the priority of the communication based on the calculated importance of a participant in the communication.

2. A computer-readable storage device that is not a signal, for storing computer-executable instructions for controlling a computer system to determine priority of a communication having persons who are participants in the communication, by a method comprising:
    identifying sender and recipient relationships between persons, the persons including senders and recipients of communications, the relationships being sender and recipient relationships such that a relationship between a first person and a second person occurs when the first person is a sender of a communication and the second person is a recipient of that communication by:
        generating a sender and recipient matrix of entries with a row and a column for each participant in a communication that is an electronic mail message; and
        for each electronic mail message, for each recipient of that electronic mail message,
            incrementing the entry of the sender and recipient matrix corresponding to the sender of the electronic mail message and that recipient;
    calculating a sender and recipient importance of each person based on the sender and recipient relationships
        wherein the sender and recipient importance of the persons is calculated by iteratively calculating the sender and recipient importance of each person based on the sender and recipient matrix and the sender and recipient importance of each person as calculated in a previous iteration until the sender and recipient importance of the persons converges on a solution; and wherein the calculating of the sender and recipient importance of the persons is based on the following equation:

$$A^T w = w$$

where $A^T$ represents a transpose of the sender and recipient matrix such that $A_{ij}$ represents the number of electronic mail messages sent from person i and person j and w is a vector of with a sender and recipient importance score $w_j$ for each person j as represented by the following equation:

$$w_j = \Sigma_i A_{ij} w_i;$$

identifying distribution list relationships between persons, the persons being on distribution lists for communications, the relationships being distribution lists relationships such that a relationship between a first person and a second person occurs when the first person and the second person are on the same distribution list by:

generating a distribution list matrix of entries with a row and a column for each person on a distribution list; and for each distribution list, for each person on that distribution list, incrementing the entries of the distribution list matrix corresponding to that person and each other person on the distribution list;

calculating distribution list importance of each person based on the distribution list relationships wherein the distribution importance of the persons is calculated by iteratively calculating the distribution list importance of each person based on the distribution list matrix and the recipient importance of each person as calculated in a previous iteration until the distribution list importance of the persons converges on a solution; and wherein the calculating of the distribution list importance of the persons is based on the following equation:

$$A^T w = w$$

where $A^T$ represents a transpose of the distribution list matrix such that $A_{ij}$ represents the number of distribution lists that both person i and person j are on and w is a vector of with a distribution importance score $w_j$ for each person j as represented by the following equation:

$$w_j = \Sigma_i A_{ij} w_i;$$

calculating an importance for each person based on the sender recipient importance and the distribution list importance of that person; and calculating the priority of the communication based on the calculated importance of a participant in the communication.

* * * * *